United States Patent [19]

Bright

[11] 4,365,706

[45] Dec. 28, 1982

[54] DEVICE FOR CLEANING CONVEYOR BELTS

[75] Inventor: Donald F. Bright, Scunthorpe, England

[73] Assignee: Champion Conveyor Components Limited, Doncaster, England

[21] Appl. No.: 218,283

[22] Filed: Jan. 2, 1981

[30] Foreign Application Priority Data

| Jan. 5, 1980 | [GB] | United Kingdom | 8000345 |
| May 30, 1980 | [GB] | United Kingdom | 8017715 |
| May 30, 1980 | [GB] | United Kingdom | 8017716 |
| Jul. 12, 1980 | [GB] | United Kingdom | 8022851 |

[51] Int. Cl.$^3$ .................................... B65G 45/00
[52] U.S. Cl. ............................................ 198/499
[58] Field of Search ............... 198/499, 498, 497; 15/256.5, 256.51

[56] References Cited

U.S. PATENT DOCUMENTS 1,543,411  6/1925  Wittig ........................... 198 X/499
3,101,837  8/1963  Martin ............................... 198/499

FOREIGN PATENT DOCUMENTS 719940  3/1980  U.S.S.R. ........................... 198/498

Primary Examiner—Joseph E. Valenza
Assistant Examiner—Dennis J. Williamson
Attorney, Agent, or Firm—John T. Synnestvedt; Albert L. Free

[57] ABSTRACT

A cleaning device for cleaning a conveyor belt comprises a cleaning member mounted on a lever which can move angularly about a pivot axis extending transverse to the run of the belt, the lever also carrying a pressure member arranged to contact the face of the belt opposite to the face to be cleaned, the cleaning member being urged into contact with the surface of the belt by the reaction of the pressure member to movement of the belt causing angular movement of the lever about its pivot axis. The pressure member and cleaning member may be resiliently urged towards one another in the direction of the axis of the lever to enable wear of the cleaning member to be compensated automatically while reducing the angle through which the lever pivots during the useful life of the cleaning member.

14 Claims, 18 Drawing Figures

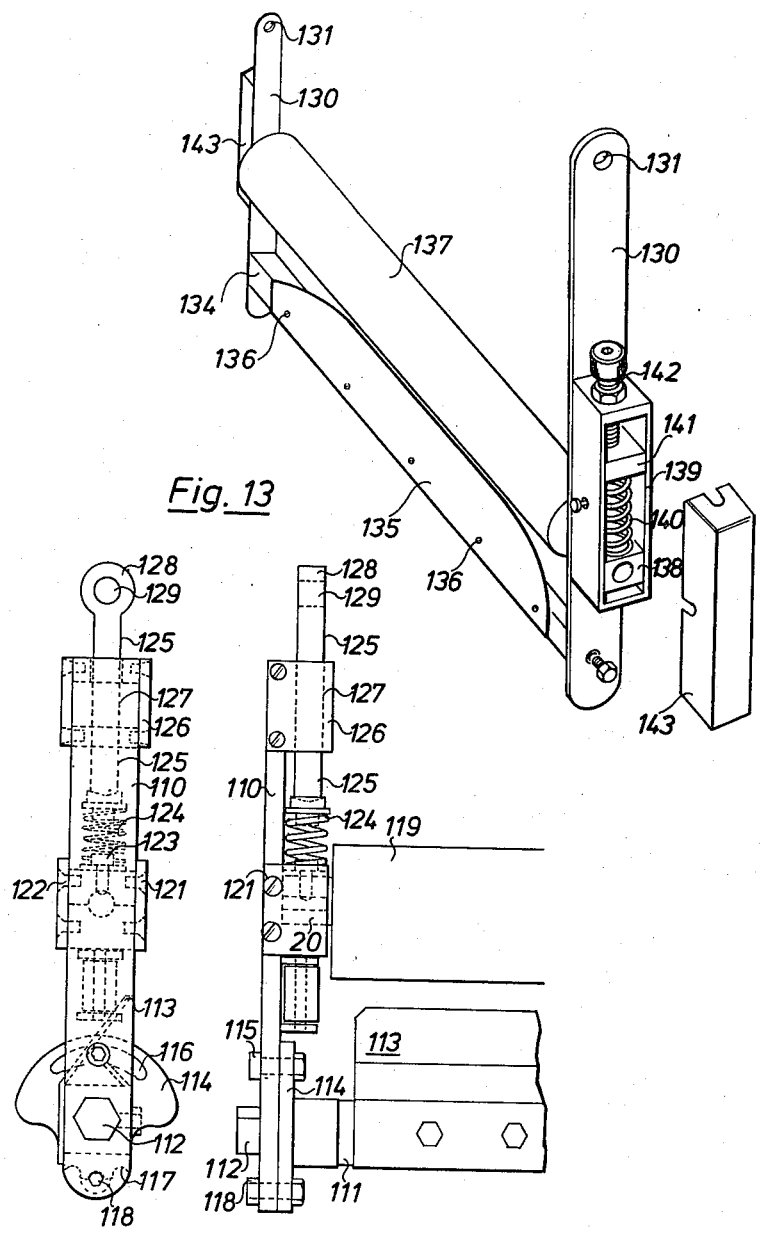

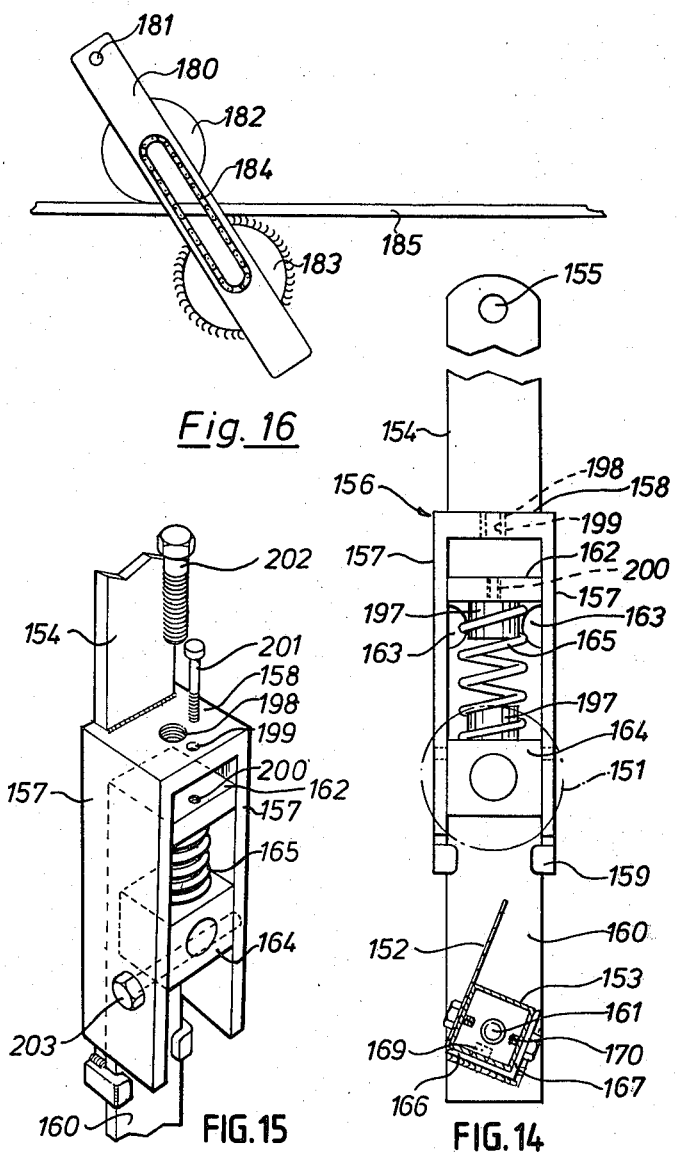

DEVICE FOR CLEANING CONVEYOR BELTS

This invention relates to a device for cleaning a conveyor belt.

The surfaces of conveyor belts, especially those carrying particulate materials such as coal and ash, can become built up in use with a layer of the materials, particularly where water is also present. This built-up of materials increases the weight of the belt and increases the loading on the drive and can lead to wear and ultimate failure of belt joints and to seizure of moving parts of the belt drive.

Scraping devices have been used to remove adhering materials from the belt after the load has been discharged. A scraping device utilising a natural or synthetic rubber blade has been used and is very effective, but in use, the blade itself wears and regular adjustment of the blade position is required to maintain efficiency.

It has been proposed to provide a scraping blade mounted on a pivoted lever having a weight arranged to urge the scraping blade into contact with the belt in the region of a guide roller therefor. Such an arrangement is described in U.K. Pat. No: 1,075,502.

U.K. Pat. No: 1,031,604 describes a cleaning device for a conveyor belt in which a pair of scraping blades are mounted on a yoke which is pivoted with respect to the belt. The blades are mounted on each side of the pivot and are urged into contact with the belt by means of compression springs, the belt being supported against the pressure of the blades by blades or rollers which provide a reaction force opposite to that provided by the cleaning blades.

It is an object of the present invention to provide an improved device for cleaning a conveyor belt.

According to one aspect of the present invention we provide a cleaning device for use in continuous cleaning of a conveyor belt, said device comprising a cleaning member which is urged into contact with the surface of the belt to be cleaned, the cleaning member being mounted on a lever which can move angularly about a pivot axis extending transverse to the run of the belt, and said lever also carries a pressure member which is arranged to contact the face of the belt opposite to the face to be cleaned, the arrangement being such that when the belt is stationary the device is in a rest position with the cleaning member out of cleaning contact with the belt and when the belt moves the movement of the belt causes the pressure member to move the lever angularly about said pivot axis to an operative position in which the cleaning member is urged into cleaning contact with the surface of the belt.

The lever may be arranged to move from its rest position through an angle of 5° to 30°, preferably 10° to 30°, and more preferably 15° to 25°.

The cleaning device according to the present invention differs from previous devices in that the lever is required to move angularly about its pivot by virtue of the reaction between the pressure member and the moving belt and the lever transmits this force to the cleaning member to urge it into contact with the belt. It has been found that this arrangement not only automatically compensates for blade wear but it also provides for a very efficient cleaning of the belt surface.

The pressure member is suitably a roller which may be freely rotatable so as to be rotated by contact with the moving belt. The cleaning member may be a scraping blade of rigid material, e.g. a metal, or of a more flexible material such as polyurethane. The blade should be sufficiently stiff to scrape the belt effectively, and stiffening reinforcements may be required with certain materials. Alternatively, the cleaning member may be a roller having a brush surface or a surface of flexible wiping elements. The roller may be rotated by a chain or other drive means from the pressure roller.

The roller and blade or cleaning roller are preferably mounted with their longitudinal axes mutually parallel and perpendicular to the axis of lever. The lever may be pivotally mounted on a fixed pivot above or below the belt, or the pivoted mounting of the lever may be coupled to a fixed point by means only of a flexible coupling such as a wire rope or ropes. The fixed point is preferably approximately the same height above or below the belt as the pivoted mounting on the lever.

The scraper blade, where used, is preferably directed towards the direction of travel of the belt, the plane of the blade making an angle of at least about 10° with the lever so as to avoid excessive pressure on the belt or even jamming, and not more than about 40° to ensure satisfactory scraping. An angle of 25° to 30° is most suitable.

In one preferred form of the invention the pressure member and the cleaning member are resiliently urged towards one another in the direction of the axis of the lever. This enables wear of the cleaning member to be compensated automatically whilst reducing the angle through which the lever pivots during the useful life of the cleaning member.

Conveniently, the resilient means comprises mechanical spring means but it will be appreciated that other resilient means such as hydraulic or pneumatic means could also be employed.

Since the above arrangement provides for automatic adjustment of the angle of the lever it would require frequent careful inspection procedures to make sure that excessive wear of the cleaning member did not occur. To this end it is preferred to incorporate abutment means which will limit the movement of the cleaning means towards the pressure means to an amount which corresponds to acceptable cleaning member wear.

In addition, in order to prevent contact of the lever or one of the associated members with a roller or other part of the conveyor, stop means may be provided to prevent undue pivoting of the lever in a forward and/or in a reverse direction.

Reference is now made to the drawings, which illustrate diagrammatically the operation of the device and show certain practical constructions, and in which:

FIG. 11 is an end elevation of an alternative form of cleaning device having provision for adjustment of the scraper angle;

FIG. 12 is a side elevation of one side of the device shown in FIG. 11;

FIG. 13 is an exploded perspective view of yet a further alternative cleaning device;

FIG. 14 is a front view of one of a pair of lever arms of yet a further alternative cleaning device;

FIG. 15 is a cut-away scrap perspective view of a part of a lever arm shown in FIG. 14;

FIG. 16 is a side elevation of an alternative form of cleaning element in the form of a rotatable brush;

Figure 1:
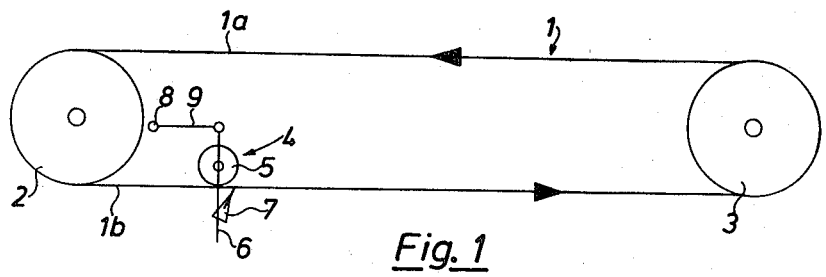
FIG. 1 is a side elevation of a conveyor belt with a cleaning device according to the invention.

Referring to FIG. 1, an endless conveyor belt 1 runs between a head drum 2 and a tail drum 3 in conventional manner, the upper part 1a of the belt travelling from the tail drum 3 towards the head drum 2. A cleaning device 4 is located on the lower part 1b of the belt near the head drum 2. The device 4 has a roller 5 which rests on the upper surface of the lower part 1a of the belt and which rotates in contact with the belt. The roller 5 is mounted between a parallel pair of arms 6, one on each side of the belt. A scraper blade 7 is also located between the arms 6 with its longitudinal axis parallel to that of the roller 5. The upper ends of the arms 6 are pivotally connected to a fixed anchorage 8 through connecting members 9 of the type described in connection with FIG. 2 or FIG. 3. The weight of the device 4 is thus supported solely by the roller 5 bearing on the belt 1, the connecting members 9 serving to prevent the device from being carried along the belt.

Materials carried by the belt may be discharged at the head drum 2, any material remaining adhering to the belt during its return travel towards the tail drum 3 being scraped off by the blade 7 and collected beneath the belt 1.

Figure 2:
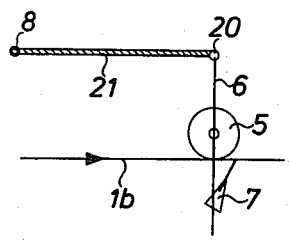
FIGS. 2 to 5 show on an enlarged scale alternative methods of anchoring the device shown in FIG. 1.
Figure 3:
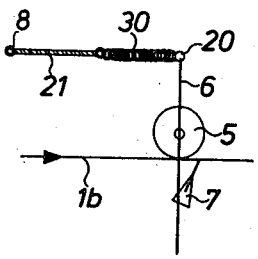

In the form shown in FIG. 2, the arms 6 each have at their upper end an eyelet 20 to which a length of wire rope 21 is coupled. The two ropes 21 run generally parallel and are fixed to the anchorage 8. In some circumstances it may be desirable to introduce some extra elasticity into the couplings, for example to allow for sudden return rotation of the device relative to the belt caused by a joint in the belt, having a greater thickness than the belt. This small degree of return rotation allows the joint to pass through the device. As shown in FIG. 3, this extra elasticity is introduced by replacing a part of the wire rope 21 with a tension spring 30, for example a helical metal spring.

Figure 4:
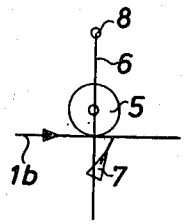
Figure 5:
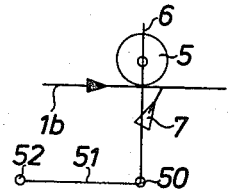
Figure 6:
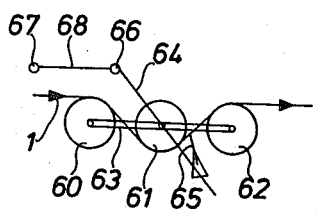
FIG. 6 shows a modified form of the device which deflects the path of the belt.

In FIG. 4, the upper ends of the arms 6 are pivotally mounted directly on the fixed anchorage 8. In this case, it is important to mount the roller 5 in such a manner as to allow free vertical float. The form shown in FIG. 5 has an eyelet 50 at the lower end of each arm 6 coupled by a rope 51 to a fixed anchorage point 52 below the belt. In this configuration, the rotation of the device will be in the opposite sense to those shown in FIGS. 1 to 4, but the rotation is only to a small degree and so the device still functions effectively.

Where the materials being conveyed by the belt have a high water content, for example, coal, deflection of the belt through a set of three or more parallel rollers can serve to remove a large proportion of the water adhering to the belt on its return run, the sudden repeated changes in direction of the belt tending to throw the water off the belt. In FIG. 6, a device is shown which combines this type of arrangement with the cleaning device of the invention. Three idler rollers 60, 61, and 62, are mounted parallel between two parallel arms 63. Two further parallel arms 64 are pivotally connected to the arms 63 at the axle of the central roller 61. A scraper blade 65 is mounted between the further parallel arms 64, whose upper ends carry eyelets 66 connected to an anchorage 67 through wire ropes 68. The belt 1 runs over the first roller 60, under the central roller 61 and over the third roller 62, the scraper blade 65 acting on the lower surface of the belt 1.

Figure 7:
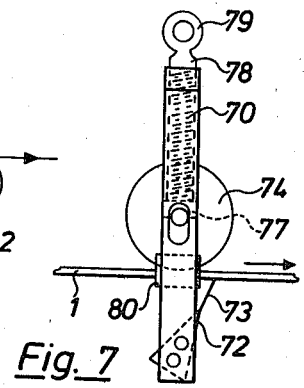
FIGS. 7 and 8 are respectively side and rear elevations of one embodiment of the invention.
Figure 8:
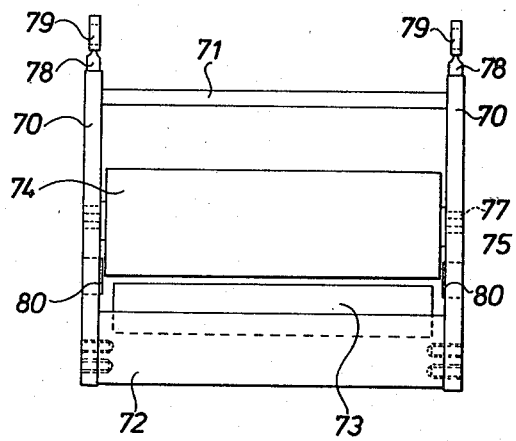

One practical embodiment of the device is shown in FIGS. 7 and 8. Two side arms 70 are joined so as to form a frame by a cross-member 71 and by a triangular section mounting block 72 for the scraper blade 73. The roller 74 has a rubber surface to ensure good grip on the belt 1 and is mounted with its spindle 75 in elongate slots 76 in the side arms 70, permitting vertical displacement of the roller. A slidable bearing pad 77 in each side arm 70 limits the upwards movement of the roller 74 and is adjustable by rotation of a threaded rod 78 in the arm. The upper end of each rod 78 carries an eyelet 79, by which the device may be anchored, as hereinbefore described. A nylon pad 80 is mounted on each arm 70, and serves to guide the device relative to the sides of the belt 1, so that the device remains in the desired position relative to the belt 1 despite wandering of the belt. Alternatively, small rollers may be used.

The scraper blade 73 is of stainless steel with a coating along the tip of a harder wear-resisting material, and is mounted in a slot in the mounting block 72, which may be formed of wood or of a plastics material. The mounting block may alternatively be of parallelpiped section with two blades mounted in it, at diagonally opposite points. This configuration enables a spare blade to be kept in reserve on the device.

Figures 9, 10:
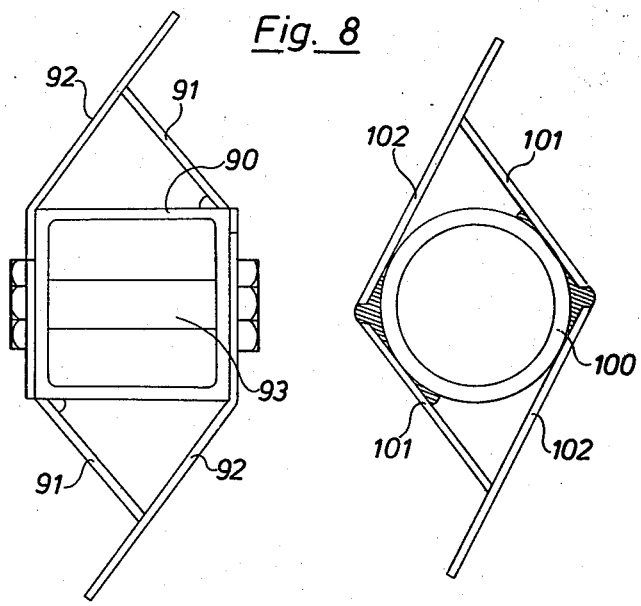
FIGS. 9 and 10 are end views of two alternative forms of scraper blade construction.

The form of blade arrangement shown in FIG. 9 has a hollow square section steel bar 90 having supporting plates 91 welded to two opposite external faces so as to make a suitable acute angle with the faces. Two blades 92 are bolted on to the two remaining faces of the bar 90, each blade consisting of an elongate rigid metal plate having two planar portions with an obtuse angle between them such that when one portion is bolted to a flat face of the bar 90, the other portion rests against a supporting plate 91. The fixing bolts 93 extend through both blades 92 and the bar 90. This configuration again provides a reserve blade and both blades are removable.

FIG. 10 shows another blade arrangement, in which a metal tube 100 forms the base and supporting plates 101 and blades 102 are welded on to the external surface of the tube at appropriate angles. This provides a reserve blade and the mounting of the tube in the device may permit angular adjustment as well as reversal to present the reserve blade to the belt.

Instead of rigid fixing in the frame of the device all the blades may be mounted by means of resilient mounts or bushes permitting slight rotational displacement when clips or other joining means for the belt pass through the device, avoiding any danger of jamming.

Although in each case the blade is shown bearing against the belt approximately in opposition to the roller, it may be desirable to have the blade bearing against the belt where it passes around the tail drum or another fixed roller. In this case, the lever will have an arm, on which the blade or other cleaning member is mounted, extending generally parallel to the belt, and may have one or more subsidiary rollers mounted beneath the belt in opposition to the pressure roller.

Another embodiment of the invention is shown in FIGS. 11 and 12 of the drawings. This device comprises a lever arm 110 having a square section bar 111 extending between the arm 110 and a similar arm at the opposite end of the bar 111 (not shown). The square section bar 111 is secured to each lever arm 110 by means of a bolt 112 and the bar 111 has a cleaning blade 113 bolted thereto.

Each lever 110 carries an end blade 114 whereby the relative position of the blade and the lever can be adjusted by means of the bolt 115 which can move in the arcuate slot 116. Positive location of the blade in the adjusted position is provided by means of the cut out portions 117 in the end of the lever 110 which engage with the bolt 118 to define three separate positions. The bolt 115 can be tightened to lock the blade in the desired position.

The pressure member comprises a roller 119 which is mounted on trunions 120 in a roller carrier 121 at each end thereof. The roller carrier is secured to the roller 110 by means of set screws 122 and a further set screw 123 serves to positively locate the trunion 120. The roller carrier 121 is urged downwardly by a coil spring 124 supported by the end of threaded bar 125 located in a bar carrier 126 having an internally threaded bore 127. The end of the bar 125 remote from the spring includes a circular formation 128 having an aperture 129 whereby the lever may be pivoted to a suitable fulcrum point.

The arrangement described above in relation to FIGS. 11 and 12 not only permits adjustment of the angle of the cleaning blade relative to the lever but also provides for adjustment of the position of the roller relative to the blade. In addition, it provides for resilient mounting for the roller to accommodate movement in the belt during the cleaning operation.

Another form of cleaning device according to the invention is shown in FIG. 13.

This device incorporates two lever arms 130 which are provided with pivot points 131 as can be seen in FIG. 13. The pivot point 131 may be, for example, attached directly to the conveyor frame or by means of an intermediate bracket. At the end of each arm 130 remote from the pivot point 131 there is a square section bar 134 which has single scraper blade 135 secured thereto by means of bolts 136.

The pressure roller 137 extends between the arms 130 parallel to the bar 134 and the trunions of the roller 137 (not shown) are received in roller carriers 138 which can move in a channel in a casing 139 secured to the arms 130. The roller carrier 138 is biased towards the scraper 135 by means of coil springs 140 located between the roller carriers 138 and abutments 141, the tension in the springs 140 being adjustable by means of the screw threaded adjusting screw 142. The channel in the casing 139 is enclosed by a channel cover 143. This embodiment of the invention is comparatively simple to produce and provides for adjustable biasing of the roller 137.

One of a pair of lever arms for a particularly preferred cleaning device according to the invention is shown in FIG. 14 of the drawings.

The device is generally similar to that shown in FIG. 13 in that it incorporates a pressure roller 151 and a cleaning blade 152 secured to a square section bar or tube 153 shown in chain-dot lines, all of which extend transverse to the belt to be cleaned.

At each end of the device there is provided a respective lever arm one of which 154 is shown in FIG. 14. The arm 154 has a pivot hole 155 forming a fulcrum and carrying a casing 156 having a pair of longitudinal side walls 157 and a top wall 158. The lever also carries a pair of guide lugs 159 disposed beneath the casing 156.

The transverse bar or tube 153 which carries the blade 152 is secured between opposed carrier plates 160 by means of bolts 161. The upper end of the carrier plate 160 is provided with a perpendicular abutment 162 and a pair of notches 163, the purpose of which will be described hereinafter. The pressure roller 161 is mounted for rotation on a shaft, the ends of which are received in blocks 164 of a size such that they can slide within the casing 156.

The device is assembled as shown in the drawing with each carrier plate 160 disposed within the casing 156, the fitting of this being made possible by the provision of notches 163 which give clearance to pass over the guides 159 so that the carrier blade 160 can then slide within the casing 156. The blocks 164 carrying the roller 151 are inserted into the casing 156 with a coil spring 165 located between the upper end of each block 164 and the abutment 162 on the carrier plate 160. In order to locate the spring 165 the abutment 162 and/or the block 164 may be provided with a projecting formation to engage the internal walls of the spring. In the drawing a spigot 197 is provided on the abutment 162 for this purpose.

It will be seen that, in use, the spring acts resiliently to urge the roller 151 and the cleaning blade 152 towards one another and this will continue as blade wear occurs. The lever will still pivot with respect to its fulcrum as described in the earlier applications but the degree of pivoting will be limited by virtue of the automatic movement of the blade 152 towards the roller 151 to compensate for wear. This automatic adjustment will continue until the abutment 162 reaches the top wall 158 of the casing 156 and thereafter no further adjustment will take place. This prevents excessive wear of the blade 152 which could damage the transverse bar or tube 153.

In order to prevent undue pivoting of the lever when the abutment 162 is in contact with the top wall 158 a stop (not shown) may be provided on the framework of the conveyor or on a member attached thereto. At this stage the cleaning action of the device will be impaired and it will therefore become apparent to the maintenance staff that a fresh cleaning blade must be fitted.

The lever of a cleaning device according to the invention may be provided with locating means arranged so as to predetermine the angle of the cleaning means relative to the lever. Where the cleaning means is carried by a transverse bar or tube such as a square section bar or tube the locating means may take the form of a pair of abutment walls arranged to receive two faces of the bar or tube.

Such locating means will determine the correct angle of the cleaning means only if the bar is inserted the right way round. Thus, in order to ensure that the bar is inserted in the right way additional locating means may be provided which differ on the left and right side of the device. In one embodiment of the invention the additional locating means may comprise a combination of a dowel and threaded hole on the locating means for engagement with a recess and for receiving a set screw, respectively.

One form of locating means for this purpose is illustrated in the embodiment shown in FIG. 14.

The carrier plate 160, for example as shown in FIG. 14 of the drawings, is provided with a projection comprising a first abutment wall 166 and a second abutment wall 167 arranged at 90° thereto so as to receive the square section bar or tube 153.

It will be apparent that this will ensure that the blade 152 is in the desired configuration provided that the bar or tube 153 is inserted the correct way round. In order to ensure that this is the case additional locating means in the form of a dowel 169 on the abutment wall 166 may be provided to locate in a corresponding recess in the bar or tube 153. The wall 167 may be provided with a hole 170 to receive a set screw which locates in a corresponding threaded hole in the bar or tube 153, if such additional locating and retention means is desired.

FIG. 15 shows an arrangement which is incorporated to facilitate installation of the cleaner on a conveyor belt. A threaded hole 200 is provided in the abutment 162 to receive a bolt 201 which passes through a clearance hole 199 in the top wall 158. A further threaded hole 198 receives bolt 202 which can then bear against the upper surface of abutment 162.

Before installation a dowel pin 203 is inserted through holes therefor in the walls 157 of the casing. The spring 165 can then be pre-compressed using the bolt 202. When the lever arms are mounted on their pivots it is essential that the arms are properly aligned otherwise free movement of the carrier plates 160 within the casing 156 will not occur. Proper alignment has been obtained only when the bolt 201 can easily be withdrawn from the threaded hole 200 since mis-alignment of the carrier plates and casing would prevent such withdrawal.

When proper alignment has been achieved the bolt 202 and then the dowel pin 203 can be removed from each lever arm. The lever arms are then in an operating condition.

The device described above is particularly convenient for use in confined spaces such as the space available between the drive head pulley and a snub roller of certain installations. The drive head pulley and snub roller are frequently located close together and there is a very small distance of belt which can be used for cleaning purposes. This device enables the wear of the cleaning member to be compensated for and thereby reduces the angle through which the lever pivots during the useful life of the cleaning member.

Forms of cleaning member other than scraper blades may be employed either together with or instead of a scraper blade. For example a rotatable cleaning member may be employed and where it is desired to drive the rotatable member drive means may be employed whereby the rotatable member is rotated with the pressure member.

In one embodiment the rotatable cleaning member may comprise a brush and the drive means may comprise a flexible element such as a driving belt or chain. The rotatable cleaning member may be provided instead of or in addition to a scraper blade.

One practical embodiment of this arrangement is shown diagrammatically in FIG. 16 in which a lever 180 having a fulcrum 181 is provided with a pressure roller 182 and a rotatable brush cleaner 183. The roller 182 and cleaner 183 are each associated with chain wheels which engage with a driving chain 184.

The arrangement is such that the rotation of the roller is in a direction opposite to the direction of movement of the conveyor belt 185.

In some situations problems can arise with cleaning worn belts which do not have a flat planar surface and where material which is particularly difficult to remove adheres to certain areas of the belt. In these situations it may be desirable to use a cleaner blade which comprises a blade carrier and a plurality of blade elements resiliently mounted on said carrier, said blade elements being arranged parallel to one another and being resiliently biassed towards the conveyor belt, when in use, whereby any individual blade element can be deflected away from the belt against the action of the biassing means.

Conveniently, the carrier is a square section metal tube and the blade elements are secured thereto by securing means such as a bolt.

The resilient biassing means may be a coil spring mounted on the bolt, although alternative biassing means such as a resilient pad or brush could be employed.

Figure 17:
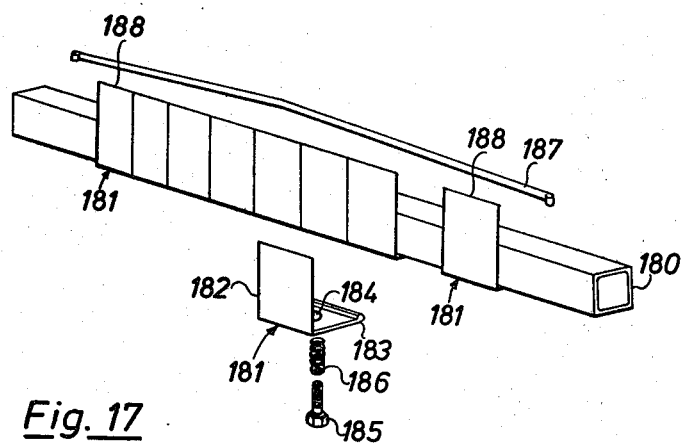
FIG. 17 is a perspective view of a further alternative form of cleaning element.

The blade comprises a steel tube 180 (FIG. 17) upon which is mounted a plurality of blade elements 181 adjacent to one another and in parallel relationship. The blade elements may be made from spring steel or other suitable material. Each blade element 181 comprises an L-shaped section, one limb 182 of which constitutes the cleaning part of the element and the other limb 183 of which is provided with an aperture 184 whereby it may be secured to the carrier 180 by means of bolt 185 received in a threaded aperture (not shown) in the carrier 180.

In order to provide resilient biassing of each blade element a coil spring 186 is located on the bolt 185. The assembly of blade elements is retained laterally by means of an elongate spring clip 187.

It will be seen that when the cleaning edges 188 of the blades 181 are in engagement with the surface of a conveyor belt to be cleaned they will be able to pivot about the end of the limb 183 in contact with the carrier 10 against the biassing of the spring 186. This enables the effective shape of the cleaning edge of the cleaner blade to adjust to conform to the shape of the belt being cleaned.

Such cleaning blades are particularly suitable for use in cleaning worn belts having uneven surfaces which frequently occur due to wear patterns developed by impact and load friction. The ability for individual blade elements to flex against the biassing means also allows for the passage of adherent material on the belt without affecting the cleaning of other areas of the belt. In addition it is possible to replace individual blade elements in the event of wear or damage.

A cleaning system for a conveyor belt comprises a pair of cleaning devices as described above, the pair of cleaning devices each being provided with a scraper which is movable relative to its supporting lever and the arrangement being such that the blades are angled in an opposite direction relative to one another so that for either direction of travel of the belt to be cleaned one of the scrapers will be in a cleaning position.

Figure 18:
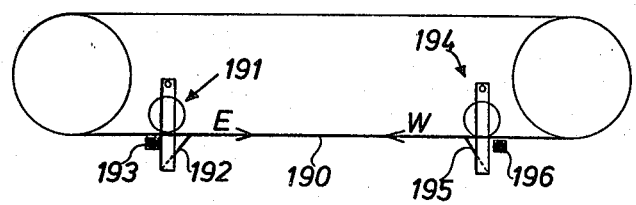
FIG. 18 is a schematic diagram of a system incorporating two cleaning devices according to the invention.

An embodiment of this aspect of the invention is illustrated schematically in FIG. 18 which shows a belt 19 which is adapted to be driven in the direction E or in the direction W.

The cleaner 191 incorporates a scraper blade 192 and a back-stop 193 whilst the cleaner 194 incorporates a scraper blade 195 and a back-stop 196. Thus, when the belt 190 runs in the direction E the scraper 192 is in its normal working position whilst the scraper 195 moves to locate against its back-stop 196 in a position clear of the belt. When the direction of movement of the belt 190 is reversed and it moves in the direction of arrow W the scraper 195 moves into its normal working position as shown in FIG. 19 and the scraper 192 moves into a raised position clear of the belt and against its associated back-stop 193.

It will be apparent from the above description that the invention provides many advantages over the prior art.

The arrangement of pressure member and cleaning member on a pivoted lever system in accordance with the invention provides a simple cleaning device which is unexpectedly efficient in cleaning a moving conveyor belt. The device also adjusts automatically to accomodate wear of the cleaning member. Furthermore, the device can move with the belt in a direction transverse to the run of the belt so that belt "wander" does not affect the efficiency of the cleaning operation.

Preferred embodiments of the invention also provide for resilient biassing of the cleaning member towards the pressure member which tends to reduce the degree of travel of the cleaning member relative to the pressure member as the cleaning member wears, thereby enabling the device to be installed in confined spaces. The provision of stop means to prevent further angular movement ensures that the amount of wear can be controlled and that the device will cease to clean the belt when a fresh cleaning member is required. This avoids the necessity for frequent maintenance inspections of the cleaning member.

I claim:

1. A cleaning device for use in continuous cleaning of a conveyor belt, said device comprising a cleaning member mounted on a lever which can move angularly about a pivot axis extending transverse to the run of the belt and said lever also carries a pressure member which is arranged to contact the face of the belt opposite to the face to be cleaned, the arrangement being such that when the belt is stationary the device is in a rest position with the cleaning member out of cleaning contact with the belt and when the belt moves the movement of the belt causes the pressure member to move the lever angularly about said pivot axis to an operative position in which the cleaning member is urged into cleaning contact with the surface of the belt.

2. A cleaning device according to claim 1 in which the lever is arranged to move from its rest position to its operative position through an angle of 5° to 30°.

3. A cleaning device according to claim 1 in which the lever is arranged to move from its rest position to its operative position through an angle of 10° to 30°.

4. A cleaning device according to claim 1 in which the lever is arranged to move from its rest position to its operative position through an angle of 15° to 25°.

5. A cleaning device according to claim 1 in which the pressure member is a roller freely rotatable about an axis parallel to the pivot axis of the lever.

6. A cleaning device according to claim 1 in which the cleaning member is a scraping blade.

7. A cleaning device according to claim 1 in which the adjustment means are provided to adjust the angle of the cleaning member relative to the lever.

8. A cleaning device according to claim 1 in which the pressure member and the cleaning member are resiliently urged towards one another.

9. A cleaning device according to claim 8 in which the urging force is adjustable.

10. A cleaning device according to claim 8 or 9 in which abutment means are provided to limit the amount of movement of the cleaning means towards the pressure means.

11. A cleaning device according to claim 1 in which stop means are provided to limit the pivoting of the lever in a forward and/or in a reverse direction.

12. A cleaning device according to claim 1 in which the pressure member is mounted on a transverse element which is fixed at each end to a sliding member arranged to slide within a casing secured to the lever and the cleaning member is secured at each end to a second sliding member also slidable within said casing the two sliding members being biased by spring means so that the pressure member and the cleaning member are urged towards one another.

13. A cleaning device for use in continuous cleaning of a conveyor belt, said device comprising a cleaning member mounted on a lever which can move angularly about a pivot axis extending transverse to the run of the belt and said lever also carries a pressure member which is arranged to contact the face of the belt opposite to the face to be cleaned, the arrangement being such that when the belt is stationary the device is in a rest position with the cleaning member out of cleaning contact with the belt and when the belt moves the movement of the belt causes the pressure member to move the lever angularly about said pivot axis to an operative position in which the cleaning member is urged into cleaning contact with the surface of the belt, said pressure being mounted on a transverse element which is fixed at each end to a sliding member arranged to slide within a casing secured to the lever and the cleaning member is secured at each end to a second sliding member also slidable within said casing the two sliding members being biased by spring means so that the pressure member and the cleaning member are urged towards one another said lever being arranged to move from its rest position to its operative position through an angle of 5° to 30°.

14. A cleaning device according to claim 13 in which the lever is arranged to move through an angle of 10° to 30°.

* * * * *